United States Patent
Lutz (10) Patent No.: US 11,674,788 B2
(45) Date of Patent: Jun. 13, 2023

(54) VALVE CLEARANCE MEASURING METHOD AND ASSEMBLY

(71) Applicant: Monte Lutz, Sioux Falls, SD (US)

(72) Inventor: Monte Lutz, Sioux Falls, SD (US)

( * ) Notice: Subject to any disclaimer, the term of this patent is extended or adjusted under 35 U.S.C. 154(b) by 0 days.

(21) Appl. No.: 17/725,092

(22) Filed: Apr. 20, 2022

(65) Prior Publication Data

US 2022/0244030 A1 Aug. 4, 2022

Related U.S. Application Data (63) Continuation-in-part of application No. 17/115,350, filed on Dec. 8, 2020, now Pat. No. 11,359,904.

(51) Int. Cl.
  *G01B 5/14* (2006.01)
  *G01B 5/00* (2006.01)
  *F01L 1/20* (2006.01)

(52) U.S. Cl.
  CPC .............. *G01B 5/0032* (2013.01); *F01L 1/20* (2013.01); *G01B 5/14* (2013.01); *F01L 2303/01* (2020.05)

(58) Field of Classification Search
  CPC ............ G01B 5/0032; G01B 5/14; F01L 1/20
  USPC ......................................................... 33/611
  See application file for complete search history.

(56) References Cited

U.S. PATENT DOCUMENTS

| | | | | |
|---|---|---|---|---|
| 2,120,617 A * | 6/1938 | Manning | ................... | F01L 1/20 123/90.47 |
| 4,065,854 A * | 1/1978 | Reed | ....................... | G01B 3/30 33/567 |
| 5,077,909 A * | 1/1992 | Cranor | ..................... | F01L 1/46 33/607 |
| 5,471,757 A | 12/1995 | McDonald | | |
| 5,665,973 A | 9/1997 | Christensen | | |
| 6,279,241 B1 | 8/2001 | Chen | | |
| 6,813,821 B1 | 11/2004 | Tseng | | |
| 6,931,744 B1 | 8/2005 | Ikerd, Jr. | | |
| 7,104,161 B2 * | 9/2006 | De Waal | ................ | B25B 27/24 123/90.52 |
| 8,919,004 B2 | 12/2014 | Wu | | |
| 9,500,462 B2 | 11/2016 | Reble | | |
| 11,359,904 B1 * | 6/2022 | Lutz | ......................... | G01B 5/14 |
| 2013/0185950 A1 * | 7/2013 | Oode | ...................... | G01B 3/30 33/783 |
| 2018/0188013 A1 | 7/2018 | Garcia | | |
| 2018/0292194 A1 | 10/2018 | Merto | | |

* cited by examiner

*Primary Examiner* — George B Bennett (57) ABSTRACT

A valve clearance measuring assembly includes a panel having a first side, a second side, a forward edge and a rearward edge. The forward edge is extendable between a valve tip and a rocker arm. The first and second sides of the panel each are planar and orientated planar with respect to each other. A head includes a central member and a pair of arms. The arms extend in a generally same direction with respect to each other to define a space between the arms. The panel is attached to the arms and traverses the space. The forward edge is in static communication with the arms such that the forward edge is in a linear configuration as the forward edge traverses the space.

18 Claims, 7 Drawing Sheets

VALVE CLEARANCE MEASURING METHOD AND ASSEMBLY

CROSS-REFERENCE TO RELATED APPLICATIONS

This application is a continuation in part application and I hereby claim the benefit under 35 U.S.C., Section 120 of U.S. application Ser. No. 17/115,350 filed on Dec. 8, 2020.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to feeler gauge device and more particularly pertains to a new feeler gauge device for measuring the valve clearance between a valve tip and a rocker arm to ensure that the valve clearance measurement is correct.

(2) Description of Related Art Including Information Disclosed Under 37 CFR 1.97 and 1.98

The prior art relates to feeler gauge devices. Such devices typically include elongated, very thin, and narrow metallic plates which have concavely arcuate ends that are extendable into a space between a rocker arm and a valve tip to measure the valve clearance, otherwise known as lash. This measurement is critical to smooth engine performance. If the clearance is too small, the valve will not properly close and there will be a power loss due to loss of cylinder pressure. If the clearance is too large, the increased travel of the rocker arms will increase engine noise and encourage damage to the rocker arm and valve components. Therefore, it is important to place the rocker arms within correct tolerances of the valve tips. However, for motors used in racing, an extremely high precision is required and can call for clearances as low as 0.001 inches. Conventional feeler gauges, due to be elongated and very thin, bend very easily and attempting to extend such into such a small gap can be very difficult as they tend to bend before being forced into the required space. For that reason, a feeler gauge device is needed that can more readily measure these narrow, strict tolerances.

BRIEF SUMMARY OF THE INVENTION

An embodiment of the disclosure meets the needs presented above by generally comprising a panel having a first side, a second side, a forward edge, a rearward edge, a first lateral edge and a second lateral edge. The forward edge is extendable between a valve tip and a rocker arm. The first and second sides of the panel each are planar and orientated planar with respect to each other. A head includes a central member and a pair of arms. The arms extend in a generally same direction with respect to each other to define a space between the arms. The panel is attached to the arms and traverses the space. The forward edge is in static communication with the arms such that the forward edge is in a linear configuration as the forward edge traverses the space.

Another embodiment includes a method of providing a plurality of feeling gauge assemblies. Each of the feeler gauge assemblies includes a panel having a first side, a second side, a forward edge, a rearward edge, a first lateral edge and a second lateral edge. The panel is comprised of a metallic material, has a width dimension measured from the first side to the second side, and a depth dimension measured from the forward edge to the rearward edge. The width dimension is from at least 0.001 inches and up to 0.05 inches and the depth dimension is less than 2.0 inches. The first and second sides of the panel are each planar and are orientated planar with respect to each other. A head includes a central member and a pair of arms, wherein the arms extend in a generally same direction with respect to each other such that a space is defined between the arms. The panel is attached to the arms and traverses the space. The forward edge is in static communication with the arms such that the forward edge is in a linear configuration as the forward edge traverses the space. A user selects one of the feeler gauge assemblies as each of the panels has a different one of the width dimensions with respect to each other. The feeler gauge assembly is selected based upon one of the width dimensions. The forward edge of the selected one of the feeler gauge assemblies is extended between a valve tip and a rocker arm to measure valve clearance between the valve tip and the rocker arm.

In yet another embodiment, the disclosure provides for a panel having a first side, a second side, a forward edge, a rearward edge, a first lateral edge and a second lateral edge. The forward edge is configured to be extended between a valve tip and a rocker arm. The first and second sides of the panel are each planar and orientated planar with respect to each other. A head includes a central member and a pair of arms extending in a generally same direction with respect to each other. The head has a front side and a rear side wherein the front side faces a same direction as the first side of the panel. A first width dimension is defined from the first side to the second side and a second width dimension is defined from the front side to the second side. The second width dimension is greater than the first depth dimension. The panel is attached to the arms and traverses the space. The forward edge is in static communication with the arms such that the forward edge is in a linear configuration as the forward edge traverses the space. The panel is spaced from each of the front and rear sides.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 15 thereof, a new feeler gauge device embodying the principles and concepts of an embodiment of the disclosure and generally designated by the reference numeral 15 will be described.

As best illustrated in FIGS. 1 through 10, the valve clearance measuring method and assembly 10 generally comprises a panel 12 that has a first side 14, a second side 16, a forward edge 18, a rearward edge 20, a first lateral edge 22 and a second lateral edge 24. The forward edge 18 is configured to be extended between a valve tip 26 and a rocker arm 28. The first 14 and second 16 sides of the panel 12 are each planar and are orientated planar with respect to each other such that the panel 12 is a generally flat piece of material. The panel 12 is comprised of a material that may have some flexibility but which is not brittle and will not crack or irreversibly deform easily under stress when being forced into the space between the valve tip and rocker arm.

Such materials will typically comprise metals and more particular iron alloys, various steel alloys, such as carbon steel and the like, though other metals and their alloys may be utilized. Generally, the materials utilized will typically be formable into extremely thin panels 12 which will not break when subjected to shearing forces needed for the discussed method. Thus, while composite materials including plastics, elastomers, and graphite are contemplated, cost, wearability, low coefficient of friction, and overall effectiveness would generally lead one to utilize metals.

The panel 12 has a width dimension measured from the first side 14 to the second side 16 and has a depth dimension measured from the forward edge 18 to the rearward edge 20. The width dimension is from at least 0.001 inches and up to 0.05 inches. Width dimensions smaller than 0.001 inches and greater than 0.05 inches will typically not be useful for the intended method. The depth dimension may be more variable though the depth dimension will typically be less than 2.0 inches as a greater depth is not required for the method described herein.

A head 30 is provided and includes a central member 32 and a pair of arms 34. The arms 34 extend in a generally same direction with respect to each other. A space 36 is defined between the arms 34. The space 36 between the arms is typically between 0.35 inches and 1.5 inches. The central member 32 and the pair of arms 34 may comprise a unitary structure as shown in the Figures and may further be comprised of a single piece of material, and more particularly a plate lying in a plane orientated parallel to a plane of the panel 12. The head 30 has a rigidity that is greater than the panel. The force required to bend the head 30 is typically greater by a factor of 100 the force required to bend the panel 12 when the panel 12 has a depth dimension being equal to or less than 0.01 inches. The plate, if used to form the head, will have a thickness typically greater than 0.1 inches, and more typically equal to at least 0.2 inches, and be comprised of the same types of materials used to form the panel 12. However, it should be understood that the head 30 may be formed of other materials or shapes including composites, plastics and the like as well include non-planar shapes, having circular or geometrically shaped cross-sections, so long as the ratio of rigidity of the head 30 to the panel 12 is as great as described above.

Figures 1, 2:
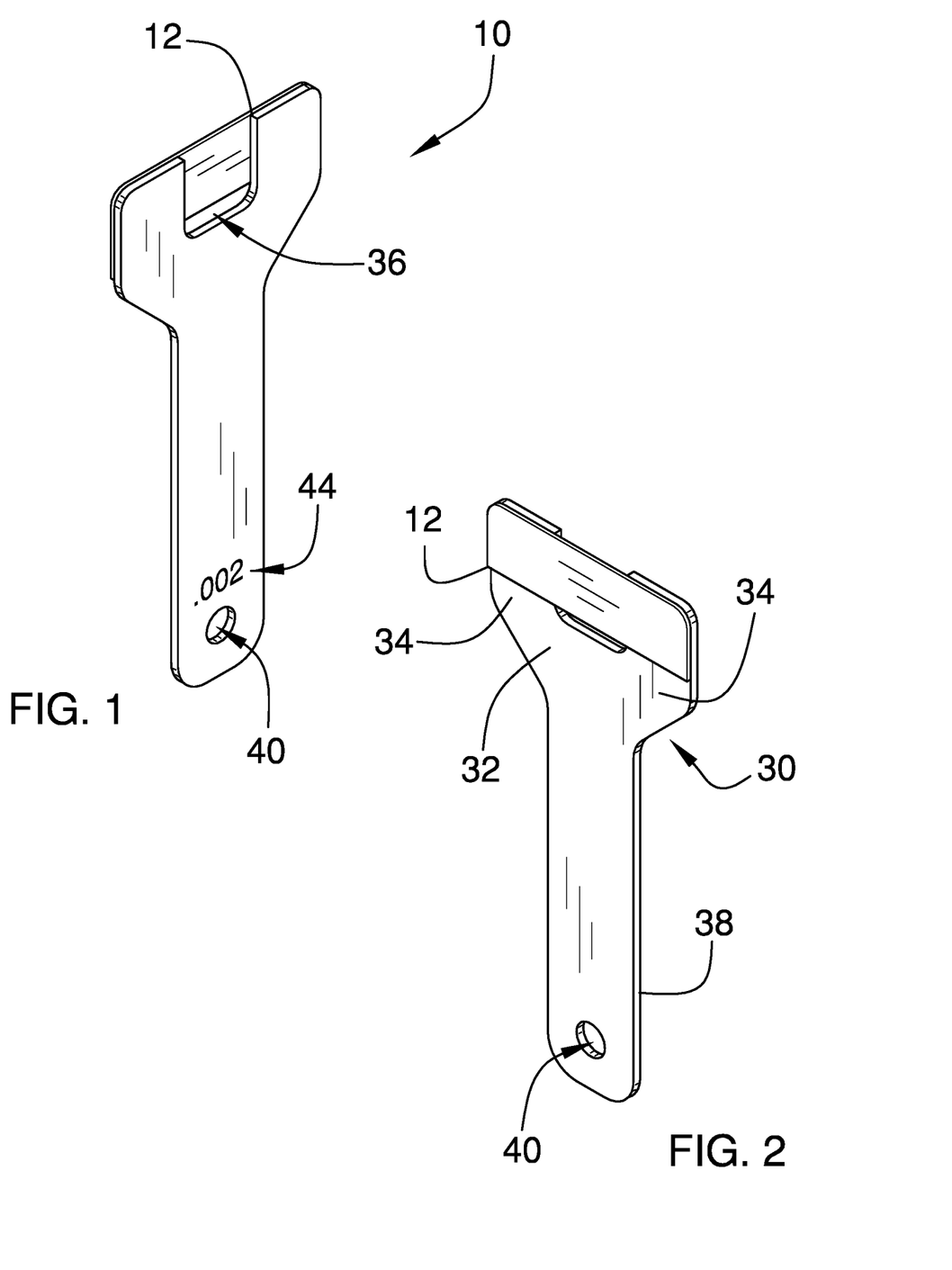
FIG. 1 is a front isometric view of a valve clearance measuring method and assembly according to an embodiment of the disclosure.
FIG. 2 is a rear isometric view of an embodiment of the disclosure.
Figure 3:
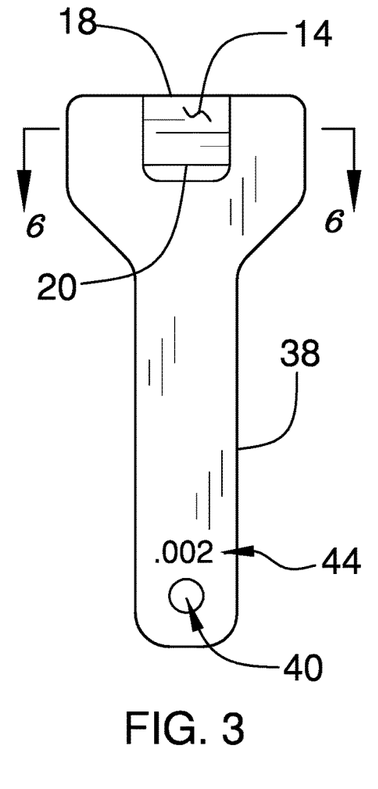
FIG. 3 is a front view of an embodiment of the disclosure.
Figure 4:
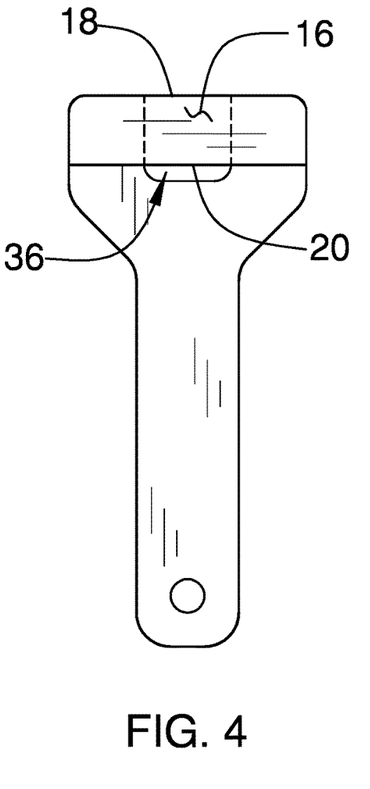
FIG. 4 is a rear view of an embodiment of the disclosure.
Figure 5:
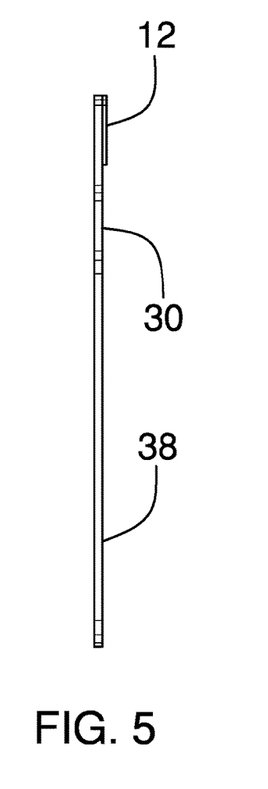
FIG. 5 is a side view of an embodiment of the disclosure.
Figure 6:
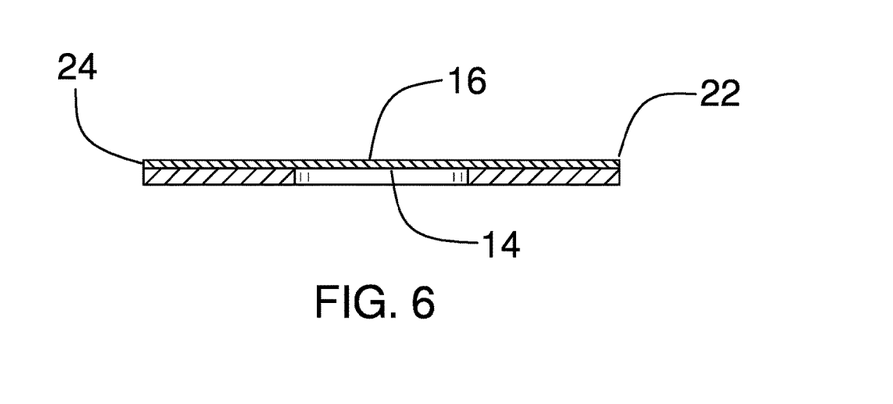
FIG. 6 is a cross-sectional view of an embodiment of the disclosure taken along line 6-6 of FIG. 3.
Figure 7:
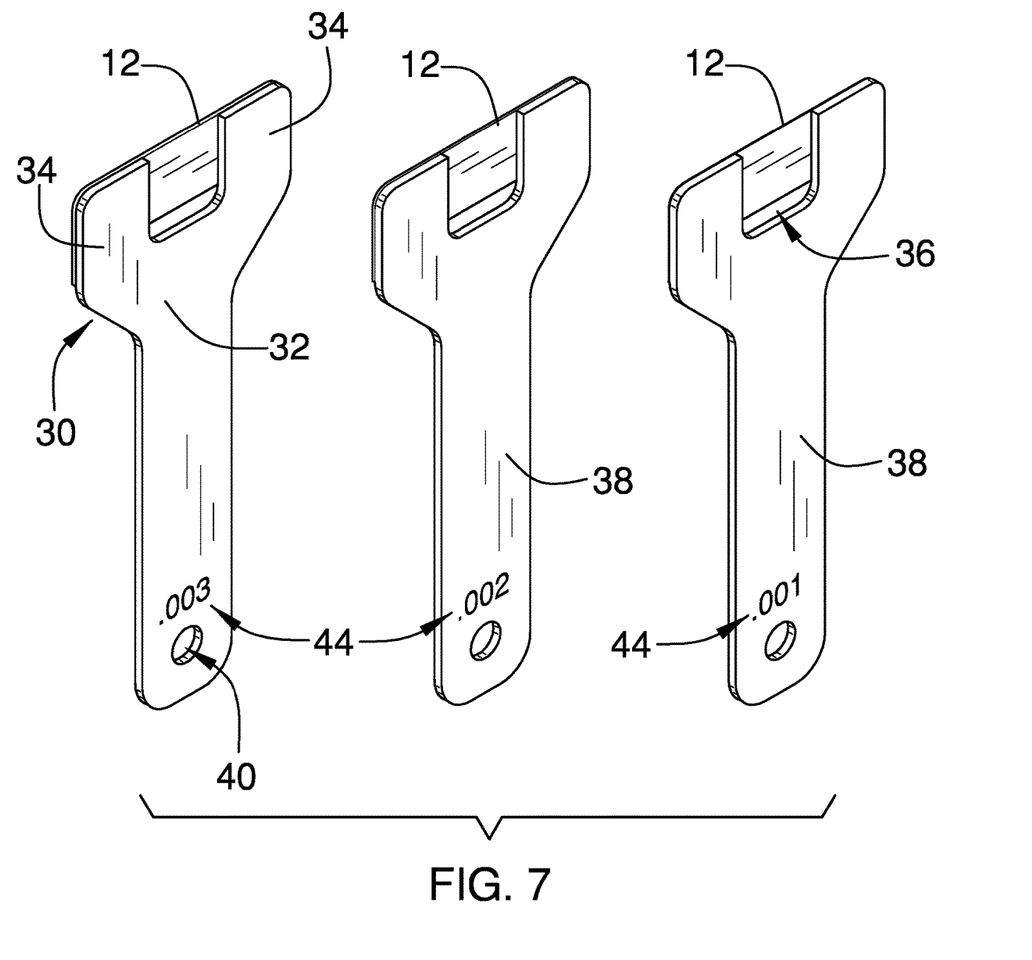
FIG. 7 is a front isometric view of a set of embodiments of the disclosure.
Figure 8:
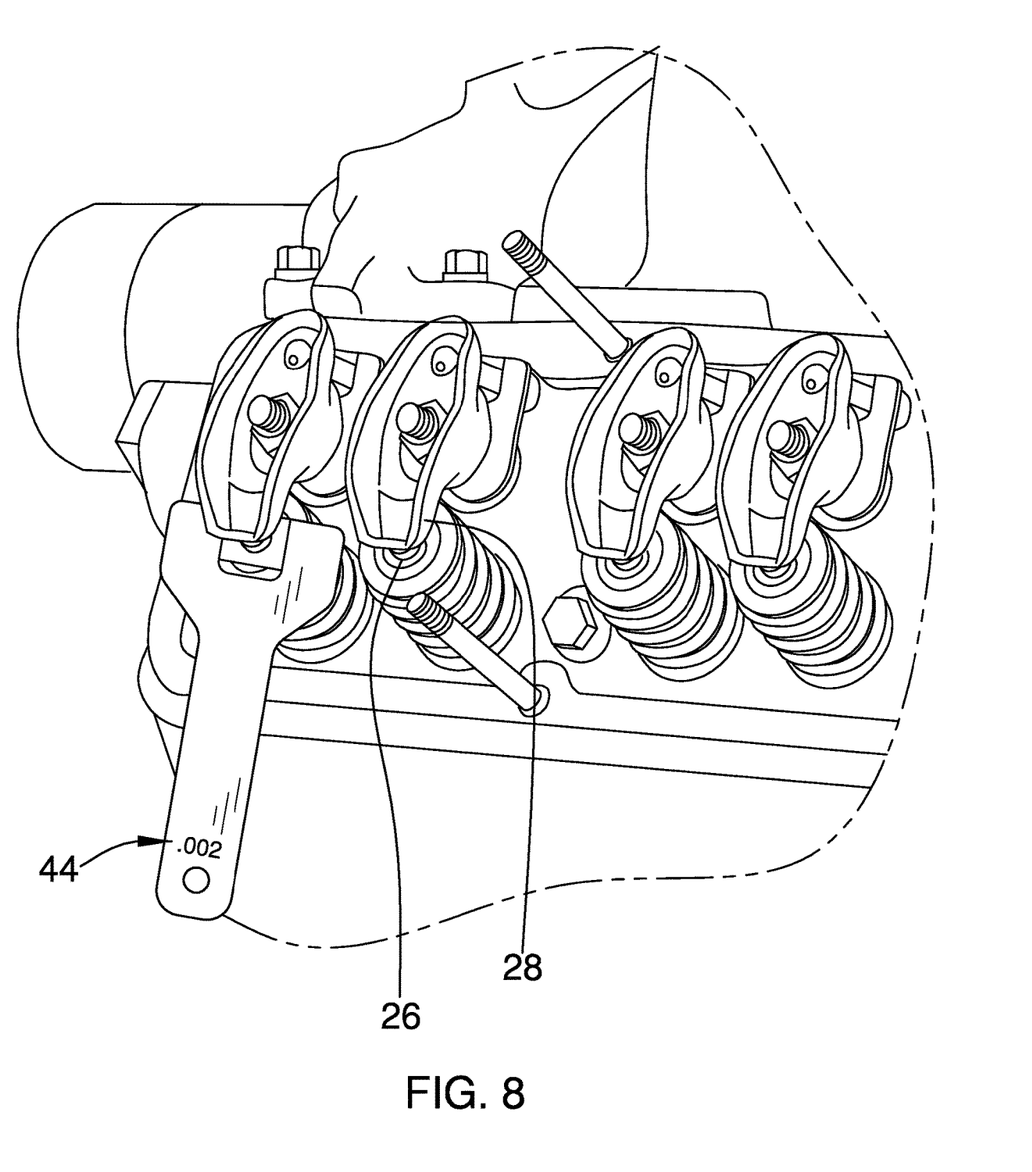
FIG. 8 is an isometric in-use view of an embodiment of the disclosure.

The panel 12 is attached to the arms 34 and traverses the space 36. The forward edge 18 is in static communication with the arms 34 such that the forward edge 18 is typically in a linear configuration as the forward edge 18 traverses the space 36. That is, the forward edge 18 is not arcuate and is within a single plane to the extent that tolerances will allow. While there may be some allowance for the forward edge 18 to be concavely arcuate, the forward edge 18 would not be convexly arcuate as such a shape would facilitate deformation when the forward 18 edge is used for measuring valve lash. However, a linear edge, as shown in FIG. 3 would typically be utilized since creating a convexly arcuate shape would lead to greater manufacturing costs and would reduce the rigidity compared to using a linear edge. The panel 12 is non-movably attached to the arms 34 such that the forward edge 18 is not easily movable or bendable relative to the head 30. That is, the forward edge 18 cannot deform as it is, essentially, pulled "taut" between the arms 34. The arms 34, being far more rigid than the panel 12, do not allow for the panel 12 to bend as it is being forced into a tight space.

Figure 9:
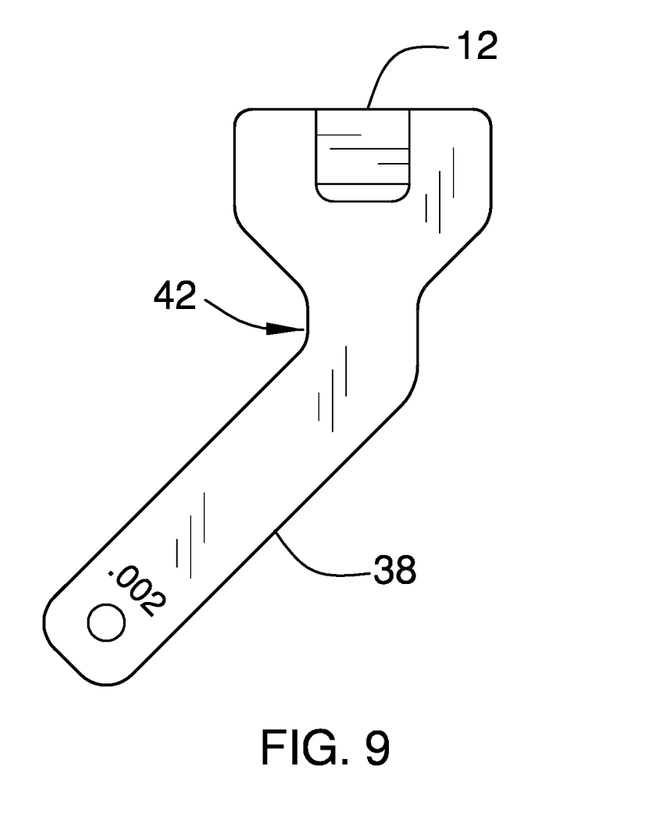
FIG. 9 is a front view of an embodiment of the disclosure including an alternate handle configuration.
Figure 10:
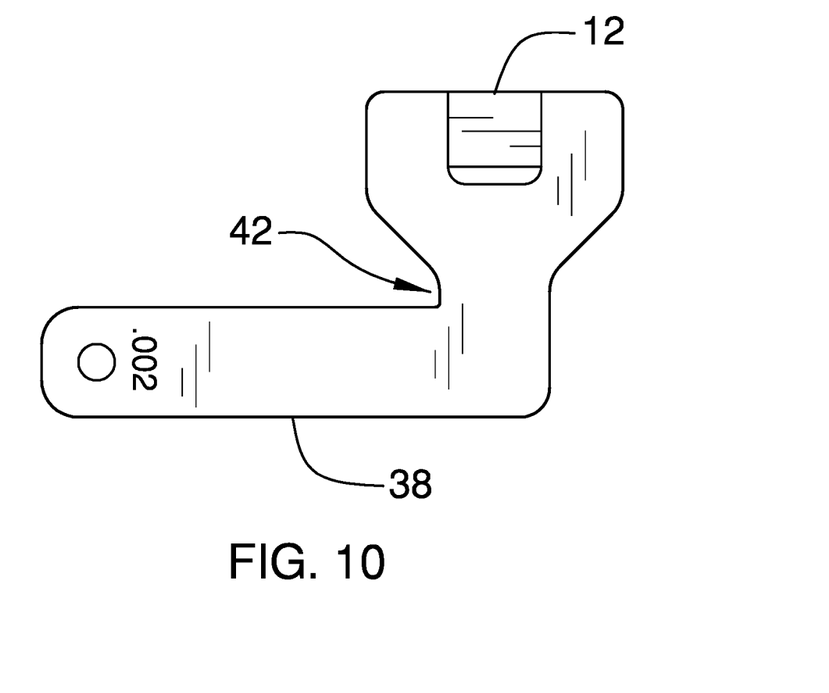
FIG. 10 is a front view of an embodiment of the disclosure including an alternate handle configuration.

The assembly 10 further includes a handle 38 that is attached to the head 30 distal to the panel 12. The handle 38 forms a convenient grip for the assembly 10 and may include an aperture 40 for receiving a tethering mechanism, such as a keyring type mechanism, to secure together a plurality of the assemblies 10. The handle 38 may be formed with the head 30 and therefore be a unitary structure with the head 30. It should be understood that panel 12, while shown as being attached to the head 30 such as by welding or other conventional fastening method, is parallel to but out of plane with the head 30 and handle 38. However, the panel 12 may be formed as a unitary structure with the head 30 and therefore within plane of opposite sides of the head 30. As can be seen in FIGS. 9 and 10, the handle 38 may be provided in various shapes such that bends 42 are incorporated into the handle 38 to allow the assembly 10 to be used in confined areas. Such modified handles 38 may be more useful, for example, with motorcycle engines where the angle and positioning of the engine makes valve access more difficult.

Figure 11:
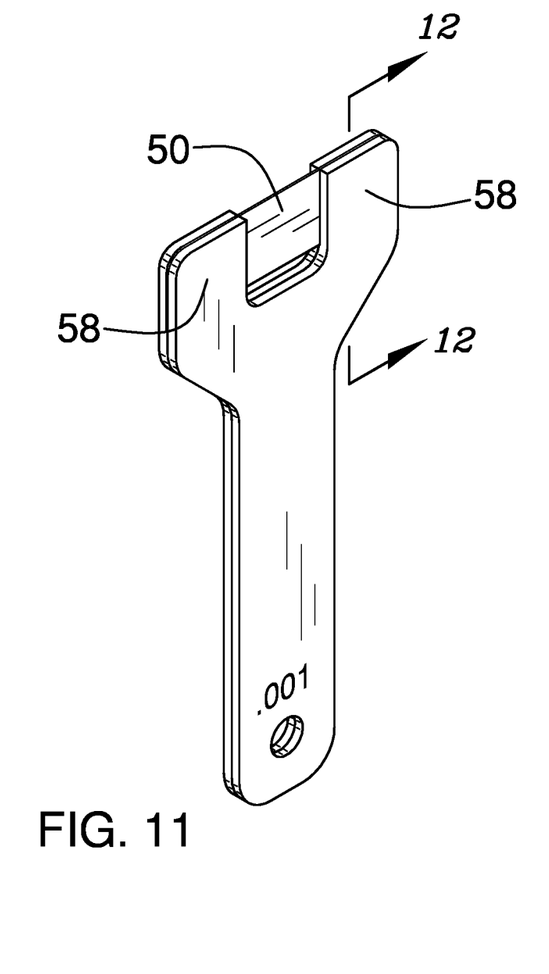
FIG. 11 is a front isometric view of a second embodiment of the disclosure.
Figure 12:
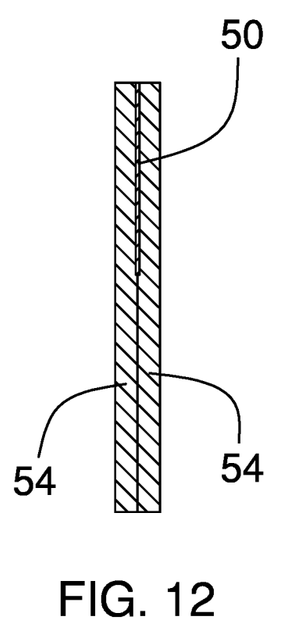
FIG. 12 is a cross-sectional view taken along line 12-12 of FIG. 11 of the disclosure.
Figure 13:
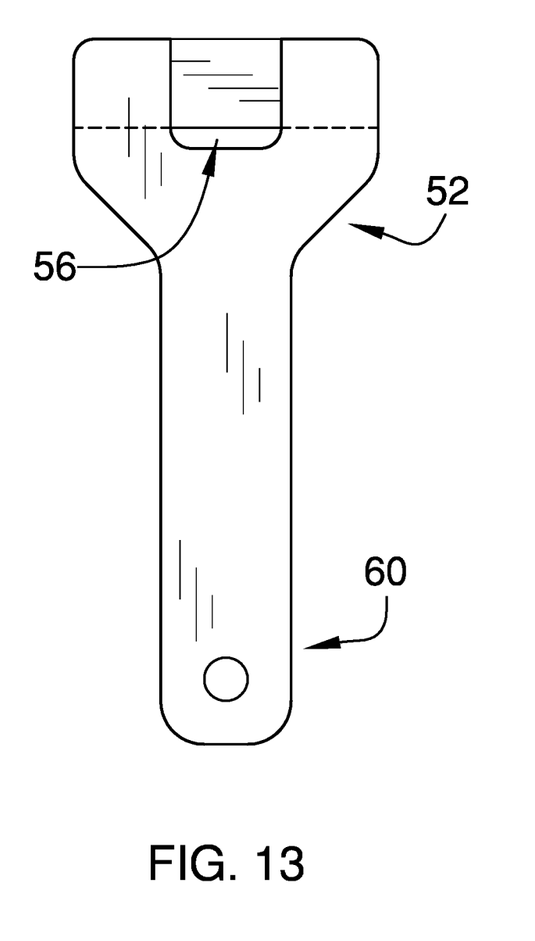
FIG. 13 Front view of the second embodiment of the disclosure.
Figure 14:
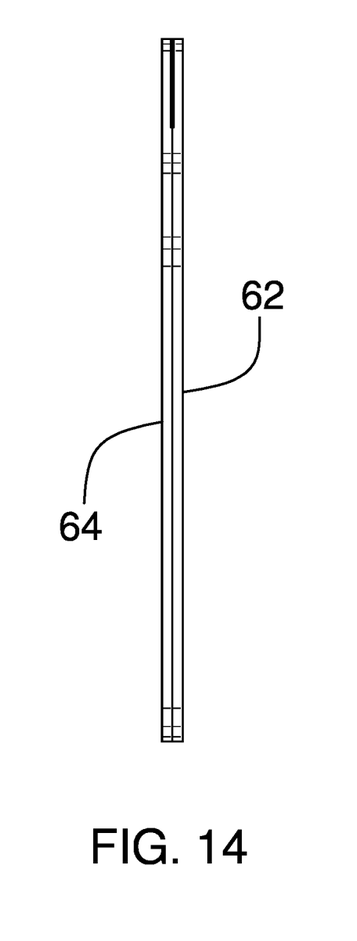
FIG. 14 is a side view of the second embodiment of the disclosure.
Figure 15:
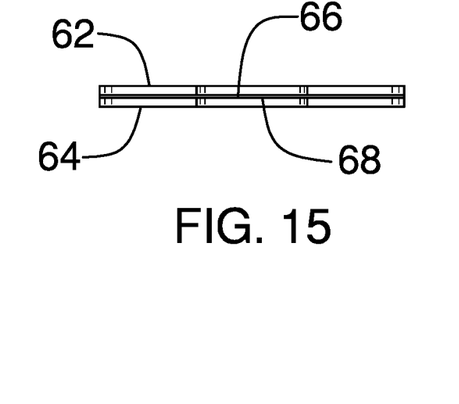
FIG. 15 is a top view of the second embodiment of the disclosure.

A second embodiment is found in FIGS. 11-15 and provides for a more robust structure to further inhibit the panel 50 from bending or warping during use. This embodiment includes a head 52 comprising a pair of plates 54 wherein the panel 50 is positioned between the plates 54 and extended across the space 56 defined between the arms 58. The plates 54 and panel 50 are secured together with conventional methods as described above. The handle 60 is attached to the head 52 and may further comprise extensions of the plates 54 as shown in FIG. 11. The plates 54 of the handle 60 are also secured together in a non-movable and generally permanent manner.

The width dimension of the panel 50 defines a first width dimension from its first side 66 to its second side 68, and the head 52 has a second width dimension defined from its front side 62 to its rear side 64 wherein the front side 62 corresponds with and faces the same direction of as the first side 66 of the panel 50. The second width dimension is greater than the first width dimension and the panel 50 is spaced from the front 62 and rear sides 64. That is, for example, should the front 62 and rear 64 sides be planar, they would lie within a pair of planes 54 between which would be positioned the panel 50. While the embodiment depicted in FIGS. 11-15 includes a head 52 and handle 60 formed of a pair of plates 54 having the panel 50 held between the plates 54, it should be understood that this second embodiment may also be formed of a unitary structure having the panel 50 spaced from the front 62 and rear 64 sides. Additionally, different shapes of heads 52, handles 60 and the angles between the head 52 and handle 60 may be provided.

In use, it should be understood that the assembly 10 will be provided as a plurality of assemblies 10 wherein each panel 12 will have a different width dimension with respect to each other. The width dimensions may be printed as indicia 44 on the assembly 10. The user will select the assembly 10 having the desired width dimension and extends, or attempts to extend, the forward edge 18 between the valve tip 26 and the rocker arm 28 to determine if the valve clearance, or lash, is correct. The user will then adjust the rocker arm 28 as needed to achieve the proper valve clearance. This may be done by retaining the panel 12 between the rocker arm 28 and valve tip 26 while the rocker arm 28 is adjusted such that the panel 12 is movable, but with some effort, between the valve tip 26 and rocker arm 28. The second embodiment of FIGS. 11-15 and described above will be used in the same manner as the embodiments of FIGS. 1-10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A feeler gauge assembly for measuring valve clearance, the assembly comprising:
    a panel having a first side, a second side, a forward edge, a rearward edge, a first lateral edge and a second lateral edge, the forward edge being configured to be extended between a valve tip and a rocker arm;
    the first and second sides of the panel each being planar and being orientated planar with respect to each other;
    a head including a central member and a pair of arms, the arms extending in a generally same direction with respect to each other;
    the head having a front side and a rear side wherein the front side faces a same direction as the first side of the panel, a first width dimension being defined from the first side to the second side, a second width dimension being defined from the front side to the second side, the second width dimension being greater than the first depth dimension;
    the panel being attached to the arms and traversing a space, the forward edge being in static communication with the arms such that the forward edge is in a linear configuration as the forward edge traverses the space; and
    the panel being spaced from each of the front and rear sides.

2. The feeler gauge assembly according to claim 1, wherein the panel is comprised of a metallic material.

3. The feeler gauge assembly according to claim 1, wherein the panel having a depth dimension measured from the forward edge to the rearward edge, the first width dimension being from at least 0.001 inches and up to 0.05 inches.

4. The feeler gauge assembly according to claim 3, wherein the depth dimension is less than 2.0 inches.

5. The feeler gauge assembly according to claim 1, wherein the central member and the pair of arms comprises a unitary structure.

6. The feeler gauge assembly according to claim 1, wherein the head comprises a pair of each lying in planes orientated parallel to a plane of the panel, the panel being positioned between the plates.

7. The feeler gauge assembly according to claim 1, further including a handle being attached to the head distal to the panel.

8. The feeler gauge assembly according to claim 3, further comprising a plurality of the feeler gauge assemblies, each of the feeler gauge assemblies having the panel having a different first width dimension with respect to each other.

9. The feeler gauge assembly according to claim 4, wherein the panel is comprised of a metallic material.

10. The feeler gauge assembly according to claim 9, wherein the central member and the pair of arms comprises a unitary structure.

11. The feeler gauge assembly according to claim 10, wherein the head comprises a pair of plates each lying in planes orientated parallel to a plane of the panel, the panel being positioned between the plates.

12. The feeler gauge assembly according to claim 11, further including a handle being attached to the head distal to the panel.

13. The feeler gauge assembly according to claim 12, further comprising a plurality of the feeler gauge assemblies, each of the feeler gauge assemblies having the panel having a different width dimension with respect to each other.

14. A method of measuring valve clearance, the method comprising the steps of:
- providing a plurality of feeling gauge assemblies, each of the feeler gauge assemblies includes:
  - a panel having a first side, a second side, a forward edge, a rearward edge, a first lateral edge and a second lateral edge, the panel being comprised of a metallic material, the panel having a width dimension measured from the first side to the second side, the panel having a depth dimension measured from the forward edge to the rearward edge, the width dimension being from at least 0.001 inches and up to 0.05 inches, the depth dimension being less than 2.0 inches;
  - the first and second sides of the panel each being planar and being orientated planar with respect to each other;
  - a head including a central member and a pair of arms, the arms extending in a generally same direction with respect to each other, a space being defined between the arms; and
  - the panel being attached to the arms and traversing the space, the forward edge being in static communication with the arms such that the forward edge is in a linear configuration as the forward edge traverses the space;
  - the head having a front side and a rear side wherein the front side faces a same direction as the first side of the panel, the width dimension of the panel defining a first width dimension, a second width dimension being defined from the front side to the second side, the second width dimension being greater than the first depth dimension, the panel being spaced from each of the front and rear sides;
- selecting one of the feeler gauge assemblies, each of the panels having a different one of the width dimensions with respect to each other, the feeler gauge assembly being selected based upon one of the width dimensions; and
- extending the forward edge of the selected one of the feeler gauge assemblies between a valve tip and a rocker arm to measure valve clearance between the valve tip and the rocker arm.

15. The method of measuring valve clearance according to claim 14, wherein the step of providing the feeler gauges includes associated ones of the central members and the pairs of arms comprising unitary structures.

16. The method of measuring valve clearance according to claim 15, wherein the step of providing the feeler gauges includes each the head comprising a pair of plates each lying in a plane orientated parallel to a plane of an attached one of the panels, the panels being positioned between associated ones of the plates.

17. The method of measuring valve clearance according to claim 16, wherein the step of providing the feeler gauges further includes each the feeler gauge including a handle being attached to one of the heads distal to an associated one of the panels.

18. The method of measuring valve clearance according to claim 14, wherein the step of providing the feeler gauges further includes each the feeler gauge including a handle being attached to one of the heads distal to an associated one of the panels.

* * * * *